(12) United States Patent
Patel et al.

(10) Patent No.: US 11,064,260 B2
(45) Date of Patent: Jul. 13, 2021

(54) SYSTEM AND METHOD FOR LOCATING CONTENT RELATED TO A MEDIA ASSET

(71) Applicant: Rovi Guides, Inc., San Jose, CA (US)

(72) Inventors: Milan Patel, Santa Clara, CA (US); Sandip Shah, San Jose, CA (US)

(73) Assignee: ROVI GUIDES, INC., San Jose, CA (US)

( * ) Notice: Subject to any disclaimer, the term of this patent is extended or adjusted under 35 U.S.C. 154(b) by 14 days.

(21) Appl. No.: 16/788,225

(22) Filed: Feb. 11, 2020

(65) Prior Publication Data

US 2020/0186888 A1 Jun. 11, 2020

Related U.S. Application Data

(60) Continuation of application No. 16/377,562, filed on Apr. 8, 2019, now Pat. No. 10,958,980, which is a
(Continued)

(51) Int. Cl.
| | |
|---|---|
| *H04N 21/81* | (2011.01) |
| *G06Q 30/02* | (2012.01) |
| *H04N 21/47* | (2011.01) |
| *G06F 16/242* | (2019.01) |
| *H04N 21/45* | (2011.01) |
| *H04N 21/466* | (2011.01) |

(Continued)

(52) U.S. Cl.
CPC ..... *H04N 21/4821* (2013.01); *G06F 16/2425* (2019.01); *G06Q 30/0255* (2013.01); *H04N 21/278* (2013.01); *H04N 21/4532* (2013.01); *H04N 21/4668* (2013.01); *H04N 21/47* (2013.01); *H04N 21/472* (2013.01); *H04N 21/4755* (2013.01); *H04N 21/8133* (2013.01)

(58) Field of Classification Search
CPC ............. H04N 21/4821; H04N 21/278; H04N 21/4532; H04N 21/4668; H04N 21/47; G06F 16/2425; G06Q 30/0255
See application file for complete search history.

(56) References Cited

U.S. PATENT DOCUMENTS

| | | |
|---|---|---|
| 6,025,837 A | 2/2000 | Matthews |
| 6,239,794 B1 | 5/2001 | Yuen |
| (Continued) | | |

FOREIGN PATENT DOCUMENTS

| | | |
|---|---|---|
| WO | WO-2008045305 | 4/2008 |

OTHER PUBLICATIONS

PCT International Search Report and Written Opinion for International Application No. PCT/US2017/022110, dated Jul. 14, 2017 (17 pages).

*Primary Examiner* — Jefferey F Harold
*Assistant Examiner* — Franklin S Andramuno
(74) *Attorney, Agent, or Firm* — Haley Guiliano LLP

(57) ABSTRACT

Systems and methods are disclosed herein for providing content related to a user-selected media asset featuring a person unrelated to that media asset, but that was involved in another media asset together with a person that was involved with the user-selected media. Specifically, a user-selection of a media asset is received and a first person involved in the media asset is identified. A second person that is associated with the first person and is not involved in the user-selected media asset is identified and content featuring the second person and related to the user-selected media asset is presented to a user.

17 Claims, 9 Drawing Sheets

Related U.S. Application Data division of application No. 15/071,854, filed on Mar. 16, 2016.

(51) Int. Cl.
*H04N 21/482* (2011.01)
*H04N 21/475* (2011.01)
*H04N 21/278* (2011.01)
*H04N 21/472* (2011.01)

(56) References Cited

U.S. PATENT DOCUMENTS

| | | | |
|---|---|---|---|
| 6,564,378 | B1 | 5/2003 | Satterfield |
| 7,165,098 | B1 | 1/2007 | Boyer |
| 7,761,892 | B2 | 7/2010 | Ellis |
| 8,046,801 | B2 | 10/2011 | Ellis |
| 8,753,185 | B1 | 6/2014 | Yen |
| 9,721,564 | B2 | 8/2017 | Agarwal |
| 2002/0174430 | A1 | 2/2002 | Ellis |
| 2005/0251827 | A1 | 7/2005 | Ellis |
| 2006/0248209 | A1 | 11/2006 | Chiu |
| 2008/0271080 | A1* | 10/2008 | Gossweiler ........ H04N 21/4334 725/47 |
| 2010/0153885 | A1 | 6/2010 | Yates |
| 2010/0319015 | A1 | 12/2010 | Remington |
| 2014/0089423 | A1 | 3/2014 | Jaeckels |
| 2015/0052115 | A1* | 2/2015 | Sharifi .................. G06F 16/435 707/722 |
| 2015/0234820 | A1* | 8/2015 | Aravamudan ..... H04N 21/4668 707/769 |
| 2015/0382052 | A1 | 12/2015 | Perlman |
| 2016/0092447 | A1 | 3/2016 | Venkataraman |
| 2016/0094889 | A1 | 3/2016 | Venkataraman |
| 2016/0173961 | A1 | 6/2016 | Coan |
| 2017/0272825 | A1 | 9/2017 | Patel |
| 2019/0306583 | A1 | 10/2019 | Patel |

\* cited by examiner

600

602
Receive a user selection of a media asset identifier corresponding to a media asset scheduled for transmission from a first content source to a plurality of users

604
Retrieve, from a database that stores associations between entities, a first entity that is associated with the media asset

606
Identify, in a data structure associated with the first entity, a field of a type that identifies a person

608
Identify, based on data within the identified field, a second entity that corresponds to a person that is associated with the first entity and is not associated with the media asset

610
Transmit a first request to a first content source and a second request to a second content source for items of content that are related to a person corresponding to the second entity

612
Identify, from the items of content received in response to the first and second requests, a plurality of items of content related to the media asset

614
Generate for display one or more content identifiers corresponding to one or more identified items of content in the plurality of items of content

FIG. 6

SYSTEM AND METHOD FOR LOCATING CONTENT RELATED TO A MEDIA ASSET

CROSS-REFERENCE TO RELATED APPLICATIONS

This application is a continuation of U.S. patent application Ser. No. 16/377,562 filed Apr. 8, 2019, which is a divisional of U.S. patent application Ser. No. 15/071,854 (now abandoned) filed Mar. 16, 2016. The entire contents of each are hereby incorporated by reference herein in their entirety.

BACKGROUND

In today's society, viewers desire a more complete experience than just watching their favorite programs. Viewers desire other people's opinions of the programs they consume. Viewers especially desire opinions of celebrities, like actors and directors, not involved in the programs themselves. At the same time, these celebrities desire to share their opinions of their colleagues' work with a wider audience, especially if those celebrities have worked together with the people involved in the program. However, current systems lack this ability. At most, current systems are able to present to a viewer a list of programs that feature a certain actress or actor from a program selected by the viewer. Specifically, these systems are able to receive a request from a user for a media asset and retrieve from memory an indication of an actor, a person in the media asset, or a content characteristic. The systems may then search other programs in a database for the same actor or characteristic and present to the user a list of media assets related to that actor or characteristic. On a more basic level, conventional systems select an attribute for a program from a database entry for that program and search database entries for other programs using the selected attribute in the search criteria. Thus, in order to recommend a program to a viewer two database entries must share at least one attribute. As such, these systems may not capture a larger portion of related content of interest to viewers.

SUMMARY

Therefore, systems and methods are disclosed herein for providing content related to a user-selected media asset featuring a person unrelated to that media asset, but that was featured in other media assets together with a person that was featured in the media asset. Specifically, a media guidance application identifies a plurality of people associated with a specific media asset and locates content related to those people. For example, Matt Damon played Jason Bourne in the movie "The Bourne Identity." The system may, upon selection of a media listing for "The Bourne Identity," determine that Matt Damon is an actor in that movie. The system may find other actors that were not involved in "The Bourne Identity," but appeared in another movie with Matt Damon. For example, Tom Hanks did not appear in "The Bourne Identity," but appeared with Matt Damon in "Saving Private Ryan." The system may find content (e.g., a podcast) that involves Tom Hanks discussing "The Bourne Identity" and present a program listing for that podcast to a viewer.

In some aspects, a media guidance application may be configured to provide the content described above. Specifically, the media guidance application may receive a user selection of a media asset identifier corresponding to a media asset scheduled for transmission from a first content source to a plurality of users. For example, a user may select a program listing for a movie "The Bourne Identity."

The media guidance application may attempt to locate entities (e.g., objects) associated with the media asset. Specifically, the media guidance application may retrieve, from a database that stores associations between entities, a first entity that is associated with the media asset. To continue with the example above, the media guidance application may retrieve from the database an entity associated with "The Bourne Identity." The retrieved entity may correspond to a cast member playing a role in the movie or a crew member (e.g., a director) involved in creating the movie.

The media guidance application may identify field types corresponding to fields that may include a person's name. Specifically, the media guidance application may identify, in a data structure associated with the first entity, a field of a type that identifies a person. For example, if the entity associated with the media asset represents Matt Damon, the media guidance application may identify a field that is titled "name."

The media guidance application may extract, from the field, the name of the person associated with the entity. Specifically, the media guidance application may identify, based on data within the identified field, a second entity that corresponds to a person that is associated with the first entity and is not associated with the media asset. To continue with the example above, if the media guidance application determines that the entity includes a field titled "name" and the name in the field is "Matt Damon," the media guidance application may identify another actor who was not featured in "The Bourne Identity," but was featured in another movie together with Matt Damon (e.g., Tom Hanks in "Saving Private Ryan").

The media guidance application may then transmit requests, to multiple content sources, for content featuring the person identified above (e.g., content featuring Tom Hanks). Specifically, the media guidance application may transmit a first request to a first content source and a second request to a second content source for items of content that are related to a person corresponding to the second entity. For example, the media guidance application may transmit a request to an Internet site and an-on-demand content provider respective requests for content featuring Tom Hanks, because Tom Hanks was not featured in "The Bourne Identity," but was featured in "Saving Private Ryan" with Matt Damon.

The media guidance application may, upon receipt of the responses from multiple content providers, identify items of content that are related to the media asset selected by the user (e.g., "The Bourne Identity"). Specifically, the media guidance application may identify, from the items of content received in response to the first and second requests, a plurality of items of content related to the media asset. In continuing with the example above, the media guidance application may receive multiple items of content featuring Tom Hanks (e.g., podcasts, interviews, chat sessions, video conferencing sessions, or another suitable item of content). The media guidance application may then determine which of those items of content are related to "The Bourne Identity" (e.g., Tom Hanks discussing Matt Damon's performance in "The Bourne Identity."

The media guidance application may present to a viewer at least a portion of the identified content. Specifically, the media guidance application may generate for display one or more content identifiers corresponding to one or more identified items of content in the plurality of items of content. For example, the media guidance application may generate for display a content identifier for a podcast featuring Tom Hanks's comments on Matt Damon's performance in "The Bourne Identity."

In some embodiments, the media guidance application may identify a field of the type that identifies a person by using keywords and field titles. Specifically, the media guidance application may retrieve a plurality of keywords, where each keyword identifies a person, and compare a title of each field that is associated with the data structure with the plurality of keywords. Based on the comparison, the media guidance application may identify the field of the type that identifies a person. For example, the media guidance application may determine that a field in the data structure corresponding to an entity is titled "name." The keywords may also include keyword "name." When the media guidance application compares the two words, the media guidance application may find a match. Based on the match, the media guidance application may determine that the field "name" identifies a person.

In some embodiments, the media guidance application may transmit respective requests to multiple content sources using the following process. The media guidance application may identify a first type of the first content source and a second type of the second content source. Based on a respective type of the first content source and the second content source, the media guidance application may retrieve a first request format associated with the first content source and a second request format associated with the second content source. The media guidance application may generate the first request based on the first request format and the second request based on the second request format, where both the first request and the second request include an identifier associated with a person corresponding to the second entity. For example, the media guidance application may select two content sources to which to transmit requests. The first content source may include one API for searching for content, while the second content source may include a different API for searching for content. The media guidance application may determine the type of content source based on the API. Thus, two different content sources using the same API may be of the same type. However, in many instances different content sources may provide different APIs for searching for content. The media guidance application may determine a request format required by each API and generate the respective requests based on the identified formats.

In some embodiments, the media guidance application may, when identifying, based on the data within the identified field, the second entity that corresponds to the person that is associated with the first entity and is not associated with the media asset, perform the following actions. The media guidance application may receive, from the database that stores associations between entities, a first plurality of entities associated with the person that corresponds to the first entity. The media guidance application may identify a second plurality of entities within the first plurality of entities that identify a person and that are not associated with the media asset. At this point, the media guidance application may select an entity from the second plurality of entities. For example, the media guidance application may identify all the entities associated with Matt Damon. That plurality may include movies that Matt Damon was featured in, actors who were featured in the same movies as Matt Damon, Matt Damon's family members, or other suitable entities. The media guidance application may then exclude from selection all of the entities that do not represent people (e.g., movies where Matt Damon was featured) and also exclude from selection any people that were involved in the movie selected by the user (e.g., "The Bourne Identity"). The media guidance application may then select a person from the remaining entities (e.g., Tom Hanks).

In some embodiments, the media guidance application may, when identifying, from the items of content received in response to the first and second requests, a plurality of items of content related to the media asset, perform the following actions. The media guidance application may receive, from the database that stores associations between entities, a plurality of entities associated with an item of content from the items of content received in response to the first or second request. The media guidance application may determine that one of the received entities represents the media asset and add the item of content to the one or more items of content.

To continue with the example above, the media guidance application may receive a number of items of content featuring Tom Hanks (e.g., a podcast featuring Tom Hanks discussing his upcoming movie, a live chat session with Tom Hanks about his personal life, and an interview with Tom Hanks discussing Matt Damon's role in "The Bourne identity"). The media guidance application may exclude the podcast and the live chat session and select the interview to provide for the user because the interview is related to the selected media asset (i.e., "The Bourne Identity").

In some embodiments, the media guidance application may determine a type of content that for different items of content it locates, and present to the user, for each content item located, an indicator that indicates the type of content to which the item corresponds. Specifically, the media guidance application may determine a type of content associated with each item of content in the plurality of items of content and generate for display, with the one or more content identifiers, a type indicator corresponding to a type associated with a respective item of content. For example, the media guidance application may generate for display a specific icon for podcasts and a different icon for chat sessions.

In some embodiments, the media guidance application may generate for display different options for different types of content upon a user selection of the content. Specifically, the media guidance application may receive a user selection of a content identifier from the one or more content identifiers and generate for display a plurality of options corresponding to the type of content associated with the content item that corresponds to the selected content identifier. Based on determining that the type of content is a podcast, the media guidance application may include in the plurality of options one or more of: an option to start streaming the podcast, an option to start streaming the podcast to another device, and an option to record the podcast. Based on determining that the type of content is an interactive communication session with the person associated with the content item, the media guidance application may include in the plurality of options one or more of: an option to connect to the communication session, an option to connect to the communication session using another device, and an option to save a transcript of the communication session.

In some embodiments, the media guidance application may identify more content items than should be generated for display. In those instances, the media guidance application may select a subset of content items to generate for display based on a weighted average of a degree of association between the item and the media asset, and a user's preference for the type of the content item. Specifically, the media guidance application may retrieve a value corresponding to the number of identified items to be generated for display and determine that the number of identified items to be generated for display is greater than the retrieved value. The media guidance application may select a subset of the identified items to be generated for display based on a weighted average of: a degree of association between each identified item of content and the media asset, and a user's preference for a particular type of content.

For example, the media guidance application may identify ten items of content to generate for display. However, only five items of content should be generated for display. The media guidance application may determine how closely each item of content is related to the media asset selected by the user on a scale (e.g., one to ten). The media guidance application may also determine the type of content that the user prefers (e.g., based on the user's consumption history and/or based on the user's specified preference). The media guidance application may then weigh these factors to determine the list of five to be presented to the user.

In some embodiments, the media guidance application may generate for display with the one or more content identifiers an indication of the first entity. For example, if Tom Hanks is being featured in a podcast provided to the user because he is associated with Matt Damon, Matt Damon's picture may be displayed next to the program listing for the podcast. In some embodiments, the media guidance application may, additionally or alternatively, generate for display an indication of the second entity (e.g., that Tom Hanks is being featured in the podcast).

In some embodiments, the media guidance application may be configured to identify media asset entities indirectly related to other media asset entities. The media guidance application may store, in a database, a plurality of database entities including a first plurality of media asset entities and person entities, each entity including a data structure with a plurality of fields, the plurality of fields including an entity identifier field with an entity identifier field value. For example, the media guidance application may transmit, to a database server, objects representing media assets and objects representing people. These objects may be linked in such a way that media assets objects include data on people that the media assets are related to. In addition, people object may have other people objects that they are related to and media asset objects that they are related to. The database server may store those objects as entities within the database following the database schema rules. Each database entity may have a plurality of fields representing attributes as well as identifiers of related objects.

The media guidance application may receive a user selection of a media asset and retrieve a media asset identifier for the selected media asset. For example, a user may select the movie "The Bourne Identity." The media guidance application may retrieve, from storage, media asset identifier for "The Bourne Identity."

The media guidance application may proceed to locate a database entity for the selected media asset. Specifically, the media guidance application may compare the entity identifier field value stored in each of the first plurality of media asset entities, retrieved from the database, to the retrieved media asset identifier to select a first media asset entity from the first plurality of media asset entities with the entity identifier field value that matches the media asset identifier. For example, when the media guidance application retrieves the media asset identifier for "The Bourne Identity," the media guidance application may query a database to find a database entity corresponding to the movie "The Bourne Identity."

The media guidance application may proceed to find a person related to the media asset. Specifically, the media guidance application may transmit, to the database, a first query for selecting a first person value from a first plurality of person values stored in a related person field of the selected first media asset entity. For example, the media guidance application may transmit a query to locate within the entity corresponding to the media asset a person (e.g., actor, director, crew member, or other suitable person) that is related to the media asset. If the media asset is the movie "The Bourne Identity," the database server may respond with an identifier for "Matt Damon" who featured in the movie.

The media guidance application may proceed to find an entity corresponding to the received person. Specifically, the media guidance application may compare the entity identifier field value for each of the plurality of person entities to the first person value received in response to the first database query to select a first person entity from the plurality of person entities with the entity identifier field value that matches the selected first person value. For example, the media guidance application may locate an entity corresponding to "Matt Damon," who featured in "The Bourne Identity."

The media guidance application may proceed to retrieve a list of people related to the person that is related to the selected media asset. Specifically, the media guidance application may retrieve a second plurality of person values from a related person field of the first person entity stored in the database, where the second plurality of person values represent a predetermined list of people related to a person identified by the entity identifier field of the first person entity. For example, the media guidance application may retrieve respective identifiers corresponding to all people that are related to "Matt Damon." Those may include any actors that worked with Matt Damon, any crew members who were involved in media assets with him, his relatives, or any other suitable people.

The media guidance application may then select a person from the set all people related to the person related to the media asset who are also not related to the media asset. Specifically, the media guidance application may compare the second plurality of person values to the first plurality of person values to select a second person value of the second plurality of person values that does not match any of the first plurality of person values. For example, the media guidance application may start with a set of all the people related to Matt Damon and then remove from the set all people that are also related to "The Bourne Identity." The media guidance application may then select a person from the remaining set. Thus, because Tom Hanks featured in "Saving Private Ryan" with Matt Damon, the media guidance application may receive Tom Hanks as the second person.

The media guidance application may then locate within the database an entity corresponding to the person related to the person related to the media asset and retrieve other media assets related to that person. Specifically, the media guidance application may transmit, to the database, a second query for related media asset field values stored in the second person entity. For example, the media guidance application may retrieve all media assets related to Tom Hanks.

The media guidance application may determine which media assets related to the second person are also related to the media asset selected by the user. Specifically, the media guidance application may transmit, to the database, a third query for related media asset field values stored in each of the second plurality of media asset entities for a third plurality of media asset entities that each has a related media asset identifier field value that matches the media asset identifier. For example, the media guidance application may access an entity corresponding to every media asset related to Tom Hanks and create a set of entities related to Tom Hanks that are also related to the originally selected movie "The Bourne Identity."

The media guidance application may generate a display that includes at least one media asset listing corresponding to at least one of the third plurality of media asset entities received in response to the third query. For example, the media guidance application may generate for display a media asset listing of a podcast where Tom Hanks discussed "The Bourne Identity."

BRIEF DESCRIPTION OF THE DRAWINGS

FIG. 6 depicts an illustrative process that may be used to provide content featuring a person associated with a person that is related to a media asset selected by a viewer, in accordance with some embodiments of this disclosure;

DETAILED DESCRIPTION

Systems and methods are disclosed herein for providing content related to a user-selected media asset featuring a person unrelated to that media asset, but that was featured in another media asset, together with a person that was involved with the user-selected media. As referred to herein, the term viewer refers to a consumer of a media asset. For example, the term viewer may encompass a listener (e.g., of a podcast), a reader (e.g., of a chat session or an article), or any other suitable consumer of a media asset. For example, it may be useful to provide to a viewer a podcast that includes an interview with a movie director that was not involved with a user-selected media asset, but was involved in another movie with the director of the user-selected media asset.

A media guidance application may be configured for this purpose. The media guidance application may receive a user selection of a media asset identifier corresponding to a media asset. The media guidance application may retrieve, from a database, an entity that is associated with the media asset and identify a field within the received entity of a type that identifies a person. The media guidance application may extract the data from that field and identify a person corresponding to that entity. The media guidance application may identify a second person associated with the first person and at the same time not associated with the selected media asset. The media guidance application may transmit respective requests for content related to the entity corresponding to the second person to content sources and based on the responses identify items of content that are available from those content sources and are related to the selected media asset. The media guidance application may generate for display one or more content identifiers for one or more identified items of content.

Figure 1:
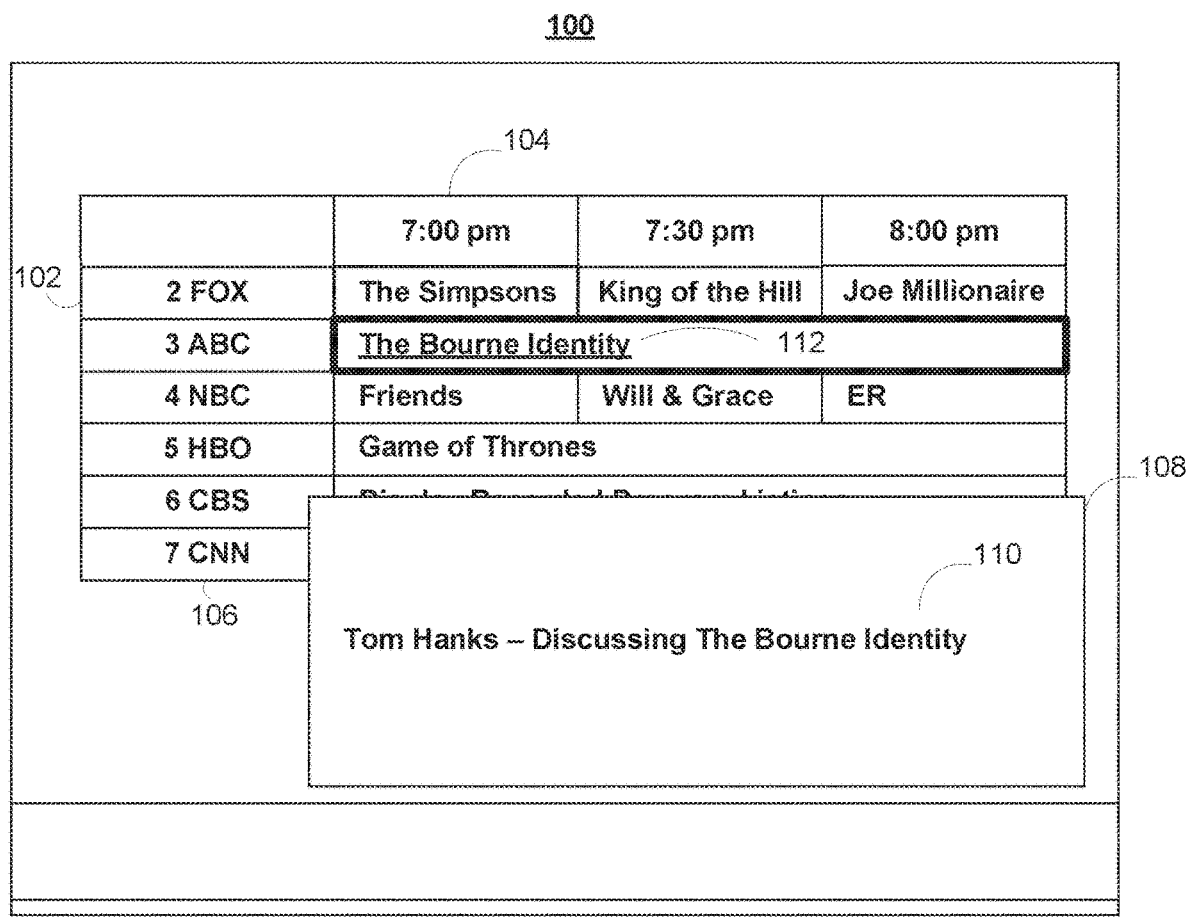
FIG. 1 shows an illustrative embodiment of a display screen that may be used to provide content featuring a person associated with a person that is related to a media asset selected by a viewer, in accordance with some embodiments of the disclosure.

FIG. 1 illustrates a display screen that may be used to provide content featuring a person not involved with a user-selected media asset and at the same time associated with a person that is involved with the user-selected media asset. Area 102 illustrates a program listing grid that may be displayed to a viewer. Time slots 104 may be located along a horizontal axis and channel indicators 106 may be located along a vertical axis. It should be noted that time slots and channel indicators may be arranged using any suitable arrangement. For example, channel indicators may be located along a horizontal axis and time slots along a vertical axis. The viewer may navigate the program listings in the grid and select program listing 112, "The Bourne Identity." The media guidance application may execute a process (e.g., process 600 of FIG. 6) and generate for display area 108 that includes item of content 110, a podcast where Tom Hanks discussed the movie "The Bourne Identity."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
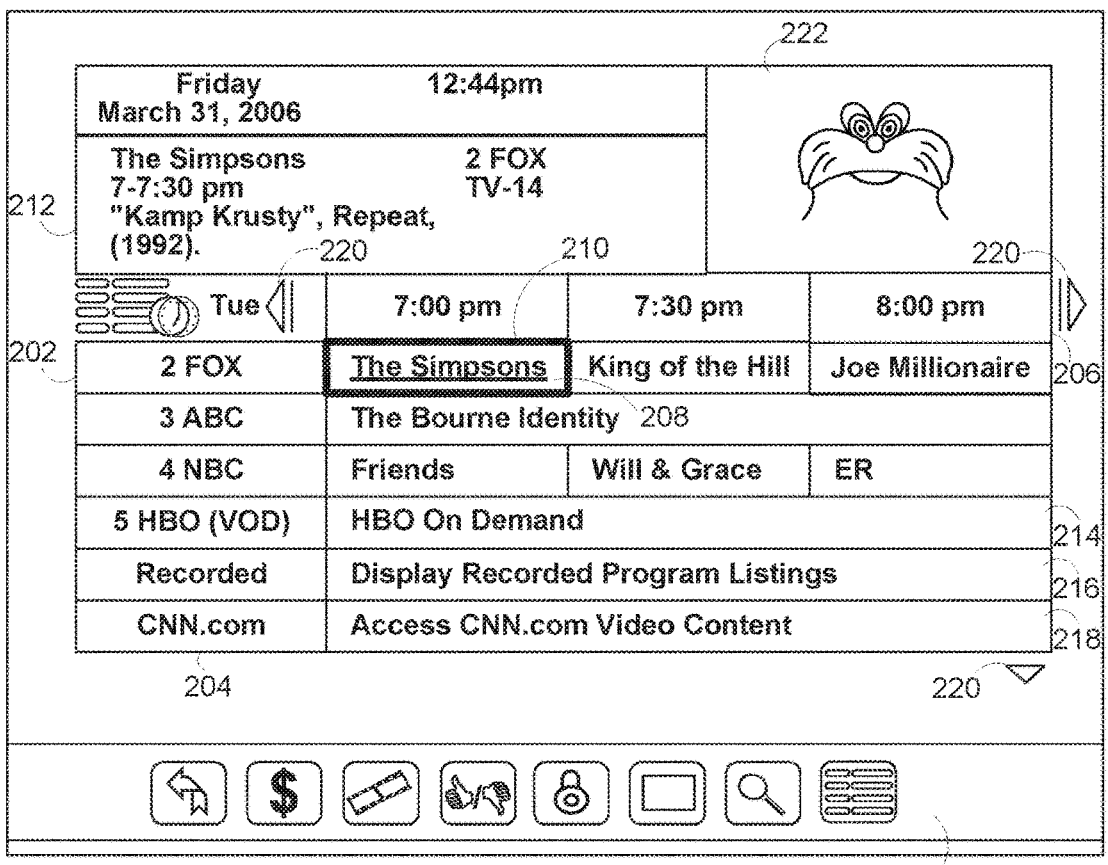
FIG. 2 shows an illustrative embodiment of a display screen that may be used to provide media guidance application listings and other media guidance information, in accordance with some embodiments of the disclosure.
Figure 3:
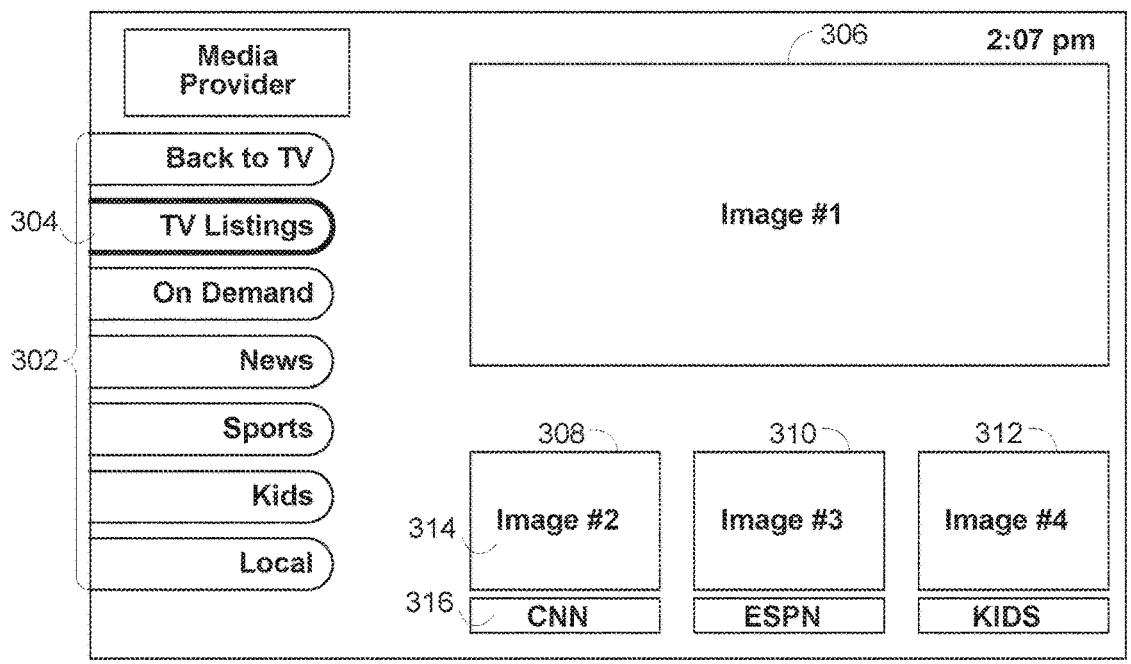
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
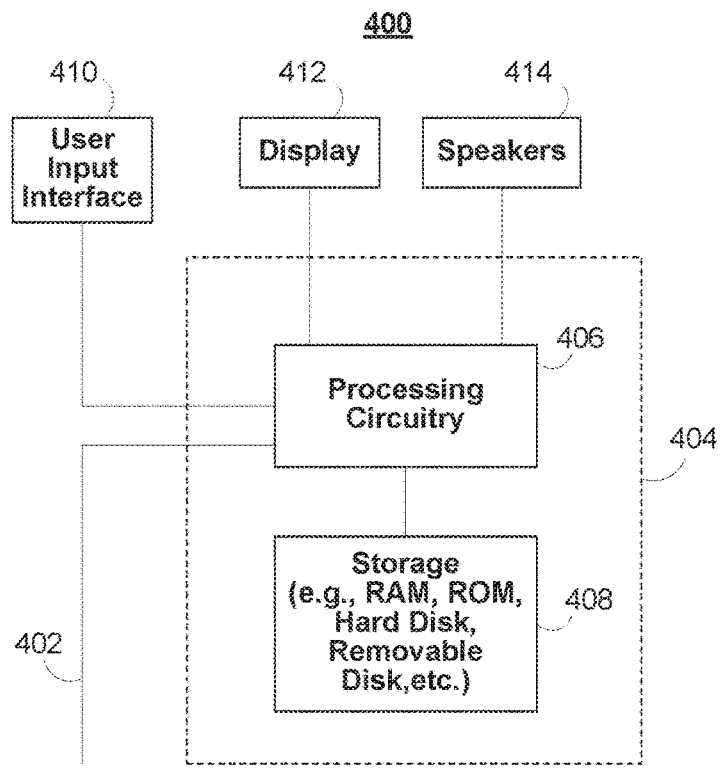
FIG. 4 is a block diagram of an illustrative device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
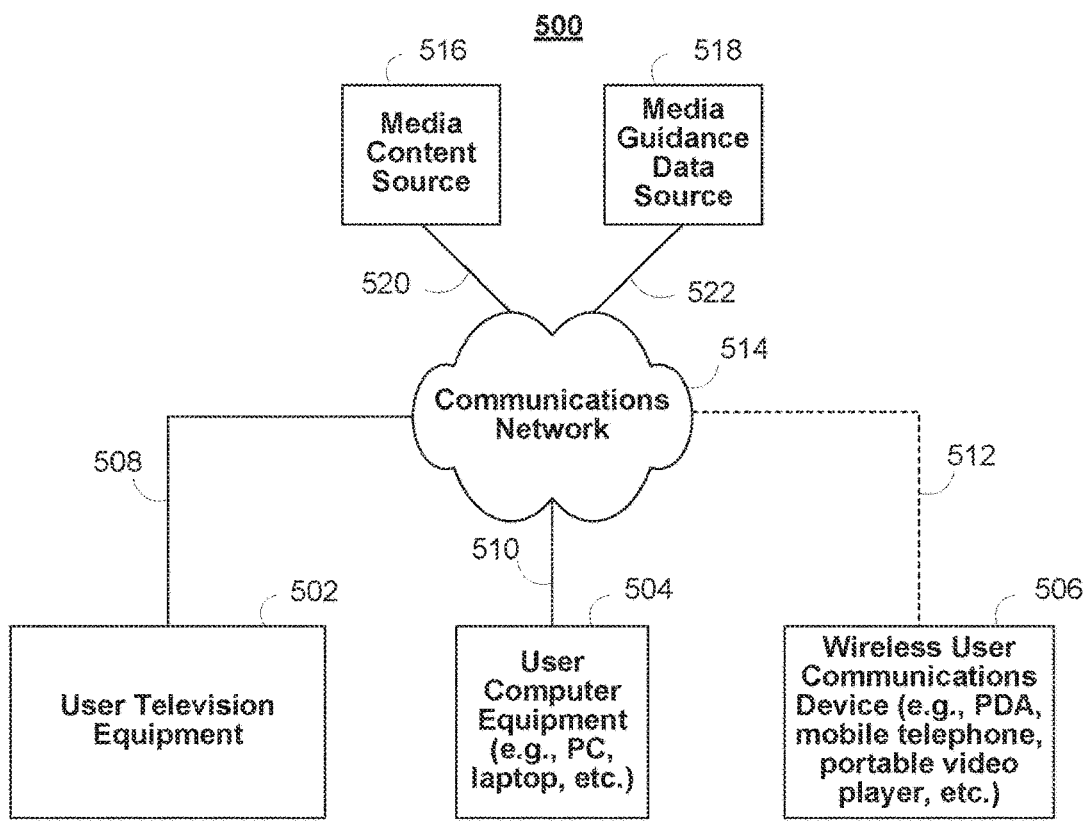
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

A media guidance application may be configured to provide content featuring a person not involved with a user-selected media asset, and at the same time associated with a second person that is involved with the user-selected media asset. For example, the media guidance application may perform (e.g., via control circuitry 404) process 600 of FIG. 6 to provide content related to people that are associated with media assets.

At step 602, the media guidance application receives (e.g., via control circuitry 404) a user selection of a media asset identifier corresponding to a media asset scheduled for transmission from a first content source to a plurality of users. For example, a user may be navigating program listings within a media guidance application. The user may be viewing display screen 200 of FIG. 2. The user may select a program listing for a media asset and the media guidance application may receive that selection. The media guidance application may receive the selection from a remote control or another suitable device.

At step 604, the media guidance application retrieves (e.g., via control circuitry 404), from a database that stores associations between entities, a first entity that is associated with the media asset. The media guidance application may perform the retrieval operation by accessing the data structure associated with the entity (e.g., entity 1102 of FIG. 11) and retrieving an entity that is linked to the media asset. The media guidance application, additionally or alternatively, may retrieve the weight associated with the link (e.g., relationship strength value 1118). The database may be located on the same device where the media guidance application is located or on a different device. For example, the database may be located at media content source 516 and/or media guidance data source 518. The media guidance application may access the database via I/O path 402. The retrieval process may involve the media guidance application generating a query to the database including the selected media asset identifier. Additionally or alternatively, the query may include another media asset identifier and/or one or more pieces of information that identify the media asset (e.g., title of the media and release year).

The database may include information describing associations and/or relationships between the entities. Each entity may be stored as a node, and the database may include a semantic network or knowledge graph of these nodes, where the semantic network maintains relationships between certain nodes. These relationships may be stored as percentage values of how related the entities are. Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties.

The media guidance application may (e.g., via control circuitry 404) transmit the query to the database and receive back a plurality of entities associated with the media asset. The media guidance application may select an entity of the received plurality of entities. As referred to herein, the term entity refers to a data structure in a database where the data structure includes a plurality of fields and represents a unique object. Each field may store information as values. As referred to herein, the term data structure refers to a specialized format for organizing and storing data. Each entity within the database includes one or more fields containing links to other entities where the links specify a weight of the connection to the corresponding entity. For example, an entity may be a website, a person, a movie, or another suitable entry.

At step 606, the media guidance application identifies (e.g., via control circuitry 404), in a data structure associated with the first entity, a field of a type that identifies a person (e.g., related entity 1114 of a type "person"). The media guidance application may receive the entity as a data structure to be stored (e.g., in storage 408). The data structure may correspond to a specific entity (e.g., "Matt Damon") and have associated fields with information related to the entity. For example, if the data structure is a person, the data structure may include fields for the person's name, age, date and place of birth, and any other suitable fields. Additionally or alternatively, the media guidance application may store a pointer to the entity in storage 408.

Figure 7:
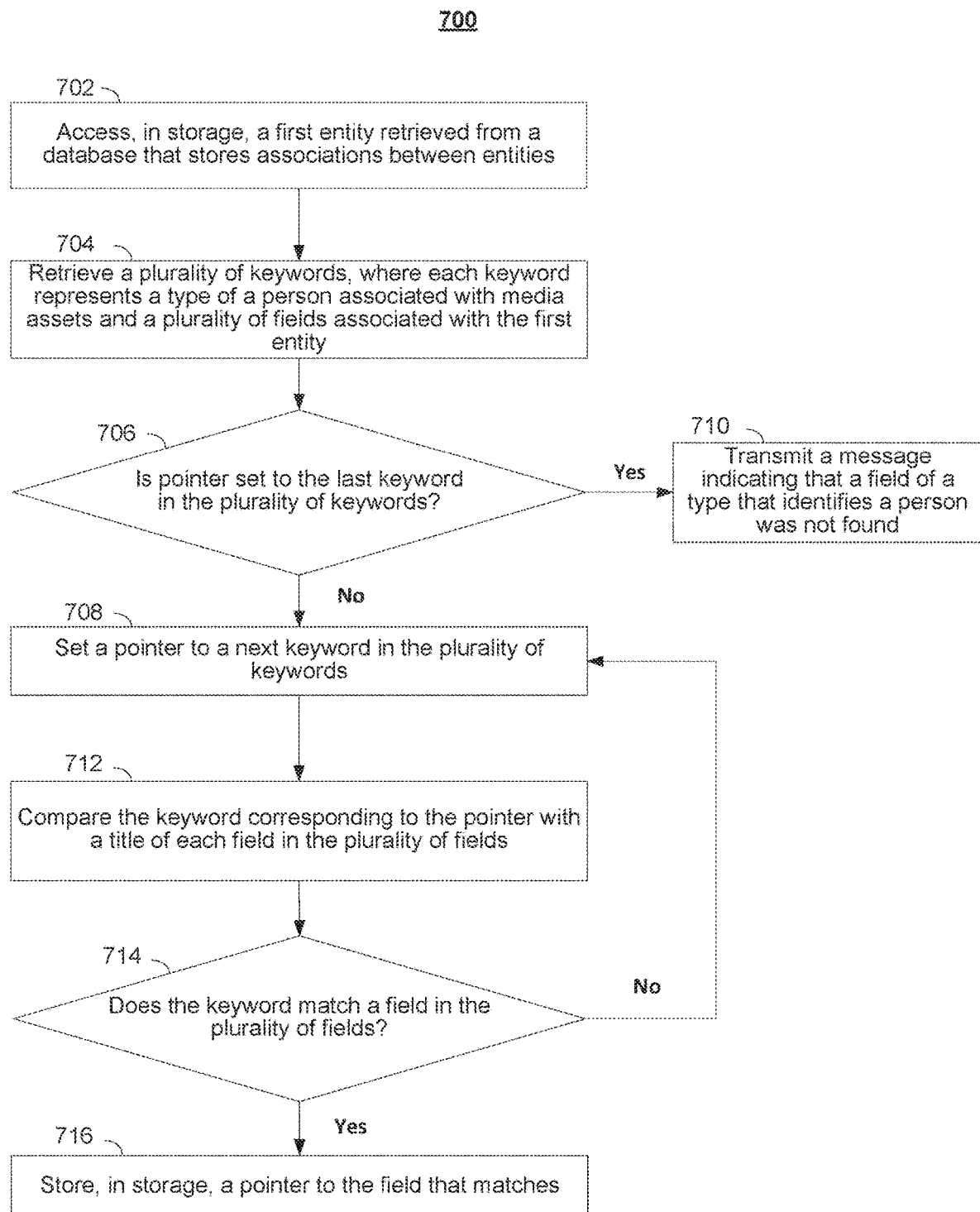
FIG. 7 depicts an illustrative process involved in identifying a field of a type that identifies a person, in accordance with some embodiments of this disclosure.

The media guidance application may identify the field of a type that identifies a person by, for example, executing process 700 of FIG. 7. At step 702, the media guidance application accesses (e.g., via control circuitry 404), in storage, a first entity retrieved from a database that stores associations between entities. Additionally or alternatively, the media guidance application may access a pointer that may have been stored in storage 408 in step 606 of process 600. The database may be located on the same device where the media guidance application resides or may be located on another device (e.g., at media content source 516 and/or media guidance data source 518). The media guidance application may retrieve those keywords from the database.

At step 704, the media guidance application retrieves the information required to identify the appropriate field. Specifically, the media guidance application retrieves (e.g., via control circuitry 404 from storage 408) a plurality of keywords, where each keyword represents a type of a person associated with media assets and a plurality of fields associated with the first entity (e.g., entity 1104 or 1106). For example, the media guidance application may have access to a database that stores potential field titles that identify a person. The titles may include a "name," "identity," "full name," or another suitable title. The media guidance application may also access the data structure associated with the entity and retrieve field names of all associated fields.

At step 706, the media guidance application determines (e.g., via control circuitry 404) whether a pointer is set to the last keyword in the plurality of keywords. It should be noted that if the media guidance application is at a first iteration of process 700, a pointer would not be set yet; thus, the pointer would not be pointing to the last keyword in the plurality of keywords. If process 700 is at the last keyword of the plurality of keywords, none of the keywords matched any fields in the plurality of fields. Thus, there is not a single field that identifies a person. Therefore, process 700 moves to step 710, where the media guidance application transmits (e.g., via control circuitry 404) a message indicating that a field of a type that identifies a person was not found. If the pointer is not at the last keyword process 700 moves to step 708.

At step 708, the media guidance application sets (e.g., via control circuitry 404) a pointer to a next keyword in the plurality of keywords. If this is the first iteration of loop that iterates through all the keywords, the pointer is not only set at the first keyword, but is also created (e.g., a variable is initialized).

A step 712, the media guidance application compares (e.g., via control circuitry 404) the keyword corresponding to the pointer with a title of each field in the plurality of fields. The media guidance application may access the title of each field and compare the title to the keyword being processed.

At step 714, the media guidance application determines (e.g., via control circuitry 404) whether the keyword matches a field in the plurality of fields. If the keyword does not match any fields in the plurality of fields, process 700 moves to step 708 where the next keyword is selected for comparison. If the media guidance application determines that the keyword matches one or more fields in the plurality of fields, process 700 moves to step 716.

At step 716, the media guidance application stores (e.g., via control circuitry 404), in storage, a pointer to the field that matches. The media guidance application may store a pointer to the field that is located on the same device where the media guidance application resides (e.g., in storage 408). Additionally or alternatively, the media guidance application may store the pointer to a field located on another device (e.g., a device located at media content source 516 and/or media guidance data source 518). In some instances, the media guidance application may store the pointer in storage 408.

It is contemplated that the descriptions of FIG. 7 may be used with any other embodiment of this disclosure. In addition, the descriptions described in relation to the process of FIG. 7 may be done in alternative orders or in parallel to further the purposes of this disclosure. For example, control circuitry 404 may submit multiple queries to the database in parallel, or it may submit multiple queries to a plurality of similar databases in order to reduce lag and speed the execution of the process. Furthermore, it should be noted that the process of FIG. 7 may be implemented on a combination of appropriately configured software and hardware, and that any of the devices or equipment discussed in relation to FIGS. 4-5 could be used to implement one or more portions of the process.

When the media guidance application identifies a field of a type that identifies a person, process 600 moves to step 608, where the media guidance application identifies (e.g., via control circuitry 404), based on data within the identified field, a second entity (e.g., entity 1106 of FIG. 11) that corresponds to a person that is associated with the first entity and is not associated with the media asset. The media guidance application may execute process 800 of FIG. 8 in order to complete the action of step 608.

At step 802, the media guidance application retrieves (e.g., via control circuitry 404), from the field corresponding to a person associated with the media asset, an identifier associated with the person. The media guidance application may have stored a pointer to the field while executing process 700, described above. Upon termination, process 700 may have returned the pointer to the identified field to process 600 and process 600 may have provided the pointer to process 800. Thus, process 800 at step 802 may retrieve an identifier (e.g., a person's name) from the field.

Figure 11:
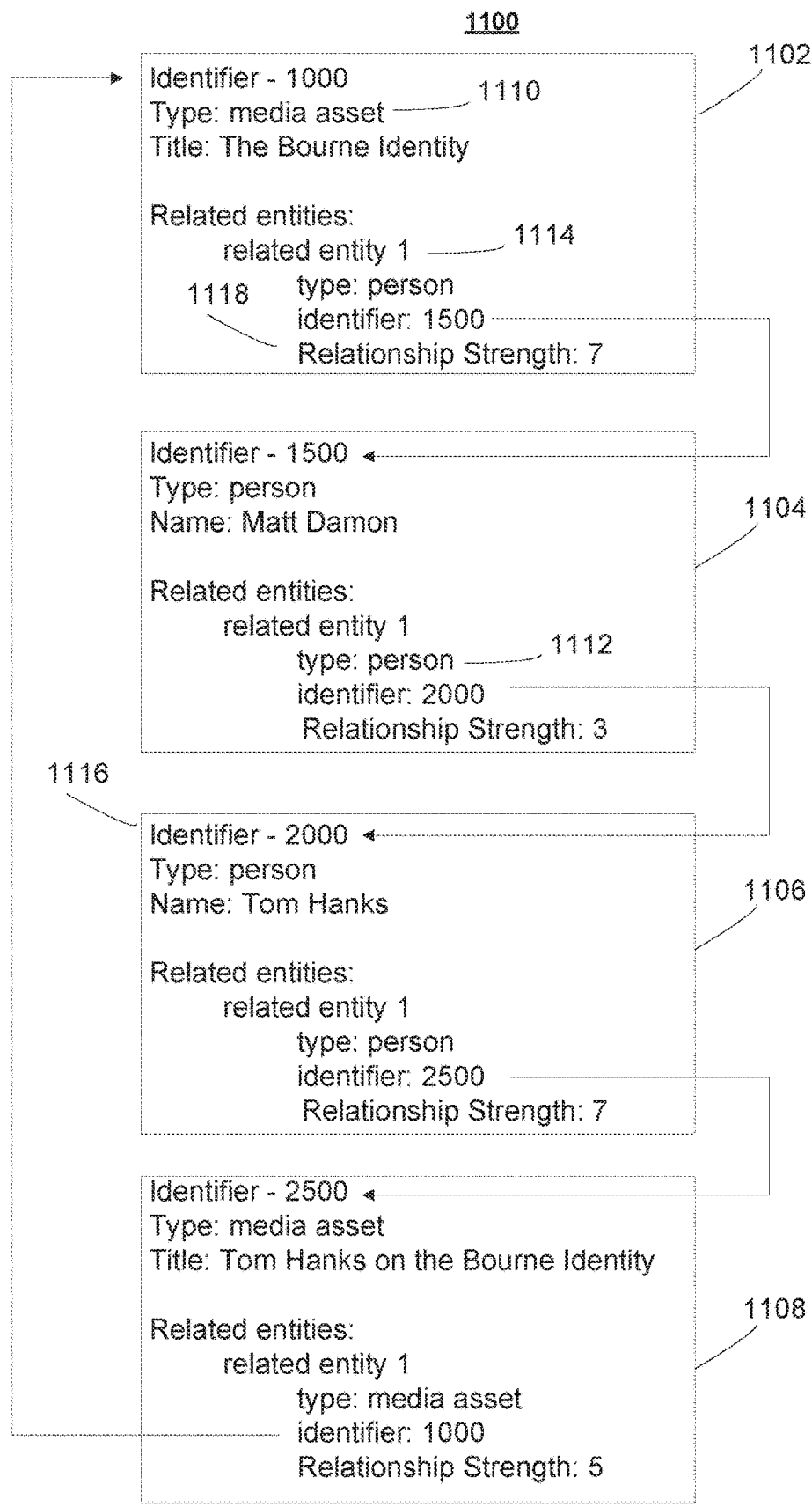
FIG. 11 depicts illustrative diagrams of database structures, in accordance with some embodiments of this disclosure.

At step 804, the media guidance application receives (e.g., via control circuitry 404), from the database that stores associations between entities, a first plurality of entities associated with the entity corresponding to the identifier (e.g., related entities of entity 1104 of FIG. 11). For example, the media guidance application may query the database and transmit a request to the database for all entities that are associated (or related) to actor Matt Damon.

At step 806, the media guidance application compares (e.g., via control circuitry 404) each entity in the first plurality of entities to a plurality of entity types. For example, each entity in the database that stores associations between entities may include an entity type (e.g., entity type 1112 of FIG. 11). As referred to herein, the term entity type refers to a classification of the object the entity represents. For example, an entity type may be a person, a media asset. Some entity types may have sub-types (e.g., a media asset may include a sub-type of movie, book, podcast, chat session, or another suitable entity type). The media guidance application may compare the entity type of the entity being processed with a known entity type to determine whether the entity represents a person.

At step 808, the media guidance application determines (e.g., via control circuitry 404) whether at least one entity corresponding to a person is included in the first plurality of entities. For example, Matt Damon may have a number of entities associated with him. Those may include entities corresponding to his relatives, the movies where he was featured, actors with whom he was featured in different movies, and other suitable entities. If the media guidance application determines that not a single entity corresponds to a person, process 800 moves to step 810 where the media guidance application transmits (e.g., via control circuitry 404) a message indicating that no entities associated with the person and not associated with the media asset were located. Thereafter, process 800 ends.

If the media guidance application determines that at least one entity corresponding to a person (e.g., entity 1106 of FIG. 11) is included in the plurality of entities process 800 moves to step 812. At step 812, the media guidance application stores (e.g., via control circuitry 404 in storage 408) a second plurality of entities that includes entities within the first plurality of entities that correspond to a respective person. The media guidance application, additionally or alternatively, may store the second plurality of entities at a device remote from a device where the media guidance application resides (e.g., at media content source 516 and/or media guidance data source 518).

At step 814, the media guidance application retrieves, from the database that stores associations between entities, entities that are associated with each entity of the second plurality of entities and determines whether one of the retrieved entities corresponds to the selected media asset. The media guidance application may retrieve, from the appropriate fields within the entity, links to other entities (e.g., one of the identifier of FIG. 11) that the entity is associated with. The media guidance application may, additionally or alternatively, retrieve a respective weight associated with the retrieved links.

At step 816, the media guidance application determines (e.g., via control circuitry 404), whether at least one entity that is not associated with the selected media asset is included in the second plurality of entities (e.g., entity 1106 of FIG. 11). For example, the media guidance application may have stored in the second plurality of entities, entities corresponding to actors Julia Stiles (who was featured in "The Bourne Identity"), Tom Hanks, and Edward Burns (neither of whom were featured in "The Bourne Identity," but were featured in "Saving Private Ryan"). In this example there would be two actors who would be associated with the selected media asset. However, if the media guidance application identified only Julie Styles, the media guidance application would determine that there are no entities in the second plurality of entities that are not associated with the media asset (i.e., "The Bourne Identity"). Thus, in this case, process 800 moves to step 808, described above. Otherwise, process 800 moves to step 818.

At step 818, the media guidance application stores (e.g., via control circuitry 404) a third plurality of entities that includes entities within the second plurality of entities that are not associated with the media asset (e.g., entity 1106 of FIG. 11). As described above, if the media guidance application, stored in the second plurality of entities, entities corresponding to actors *Julia* Stiles (who was featured in "The Bourne Identity"), Tom Hanks, and Edward Burns (neither of whom were featured in "The Bourne Identity," but were featured in "Saving Private Ryan"), the media guidance application may store in the third plurality of entities only Tom Hanks and Edward Burns because they are not associated with the selected media asset (i.e., "The Bourne Identity").

At step 820, the media guidance application selects (e.g., via control circuitry 404) an entity of the third plurality of entities. The media guidance application may select an entity based on random selection criteria or other suitable criteria. For example, the media guidance application may select an entity that has the strongest relationship with the first entity (e.g., an actor who was featured with the actor associated with the user-selected media asset the largest number of times in other media assets).

Figure 8:
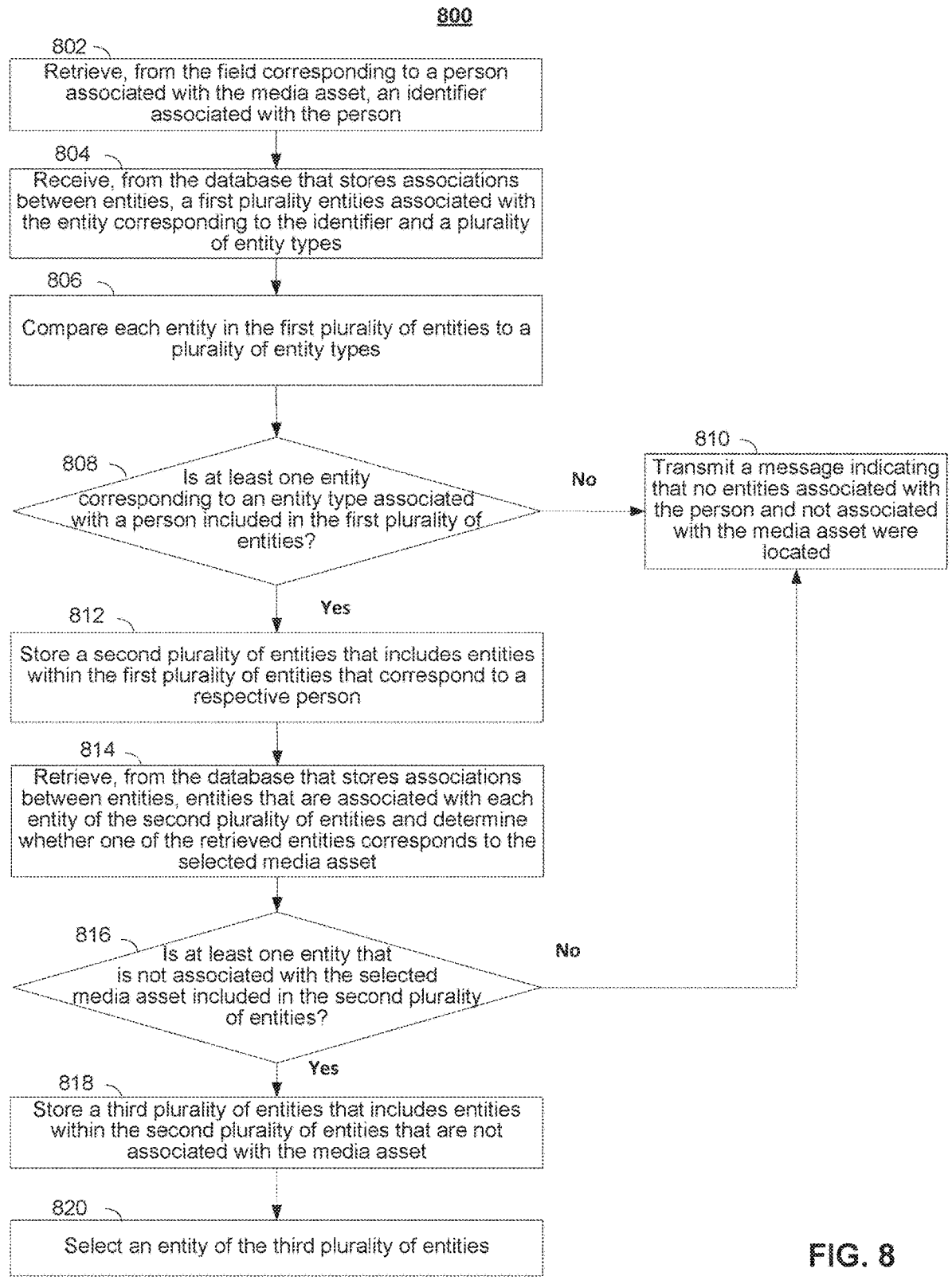
FIG. 8 depicts an illustrative process involved in identifying a person related to an entity that is associated with the selected media asset, in accordance with some embodiments of this disclosure.

It is contemplated that the descriptions of FIG. 8 may be used with any other embodiment of this disclosure. In addition, the descriptions described in relation to the process of FIG. 8 may be done in alternative orders or in parallel to further the purposes of this disclosure. It should be noted that the process of FIG. 8 may be implemented on a combination of appropriately configured software and hardware, and that any of the devices or equipment discussed in relation to FIGS. 4-5 could be used to implement one or more portions of the process.

When the media guidance application identifies, in step 608 of process 600, a second entity that corresponds to a person that is associated with the first entity and is not associated with the media asset, the media guidance application moves to step 610 of process 600. At step 610, the media guidance application transmits (e.g., via control circuitry 404) a first request to a first content source and a second request to a second content source for items of content that are related to a person corresponding to the second entity. As referred to herein, the term content source refers to a server that stores a plurality of items and is accessible to a user with or without a subscription. A content source is able to provide scheduled and non-scheduled content to multiple users over channels or one or more communication links. For example, a website or another location on the Internet may be a content source. In addition, over-the-top providers like Hulu™ and Netflix™ are also content sources. An on-demand content provider may also be considered a content source.

Figure 9:
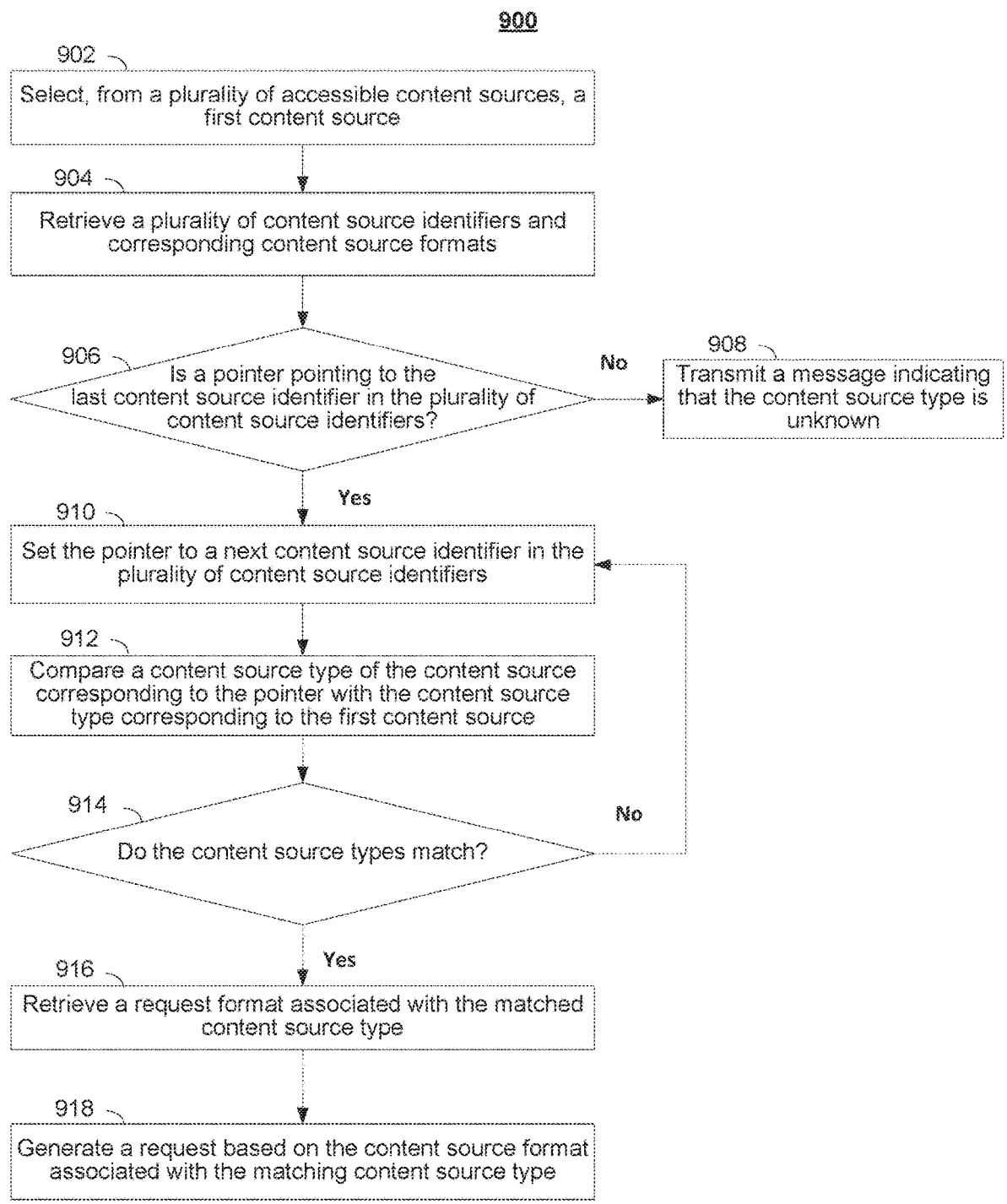
FIG. 9 depicts an illustrative process involved in generating a request to a content source based on the request format associated with a content source, in accordance with some embodiments of this disclosure.

Process 900 of FIG. 9 illustrates one method of generating a request that is transmitted to a content source at Step 610 of process 600. At step 902, the media guidance application selects (e.g., via control circuitry 404), from a plurality of accessible content sources, a first content source. For example, the media guidance application may select a first content source accessible to the media guidance application. It should be noted that the media guidance application may iterate through every available content source and repeat this process for these content sources. Additionally or alternatively, the media guidance application may perform a search (e.g., an Internet search) for available content sources. The media guidance application may use a commercial search engine or a specialized search engine designed for search media content.

At step 904, the media guidance application retrieves (e.g., via control circuitry 404) a plurality of content source type identifiers and corresponding content source formats. For example, the media guidance application may have access to a database of content sources. The database may include, for every content source, a type associated with the content source and a format for that content type required to create a request for specific media assets.

At step 906, the media guidance application determines (e.g., via control circuitry 404) whether a pointer is pointing to the last content source identifier in the plurality of content source identifiers. It should be noted that if process 900 is at its first iteration, the pointer would not be created yet, so as part of this step, the media guidance application may initialize the pointer for use in a later step. If the media guidance application determines that the pointer is pointing to the last content source identifier, process 900 moves to step 908. It should be noted that if process 900 gets to step 908, then the media guidance application was not able to locate a format type corresponding to the content source to which the request is to be sent.

At step 908, the media guidance application transmits (e.g., via control circuitry 404) a message indicating that the content source type is unknown. Thereafter, process 900 is terminated. If the media guidance application determines that the pointer is not pointing to the last content source identifier in the plurality of content source identifiers, process 900 moves to step 910.

At step 910, the media guidance application begins iterating through all the known content source identifiers retrieved at step 904. Specifically, the media guidance application sets (e.g., via control circuitry 404) the pointer to a next content source identifier in the plurality of content source identifiers.

At step 912, the media guidance application compares (e.g., via control circuitry 404) a content source type of the content source corresponding to the pointer with the content source type corresponding to the first content source. The media guidance application may perform a textual comparison for any content sources that require a query string. Alternatively or additionally, a binary comparison may be performed.

At step 914, the media guidance application determines (e.g., via control circuitry 404) whether the content source types match. If the content source types do not match, process 900 moves to step 910 where the next content source identifier is selected from processing. If the content source types match, process 900 moves to step 916, where the media guidance application retrieves (e.g., via control circuitry 404) a request format associated with the matched content source type. The request format may be retrieved from a database located locally on the device where the media guidance application resides. Additionally or alternatively, the media guidance application may retrieve the request format from another device (e.g., a device located at media content source 516 and/or media guidance data source 518). At step 918, the media guidance application generates (e.g., via control circuitry 404) a request based on the content source format associated with the matching content source type. The request is then transmitted to the appropriate content source as part of step 610 of process 600.

It is contemplated that the descriptions of FIG. 9 may be used with any other embodiment of this disclosure. In addition, the descriptions described in relation to the process of FIG. 9 may be done in alternative orders or in parallel to further the purposes of this disclosure. For example, control circuitry 404 may submit multiple queries to the database in parallel, or it may submit multiple queries to a plurality of similar databases in order to reduce lag and speed the execution of the process. Furthermore, it should be noted that the process of FIG. 9 may be implemented on a combination of appropriately configured software and hardware, and that any of the devices or equipment discussed in relation to FIGS. 4-5 could be used to implement one or more portions of the process.

When the media guidance application transmits the appropriate requests to the appropriate content sources (e.g., as part of step 610), the media guidance application may receive back a plurality of items of content. At step 612, the media guidance application identifies (e.g., via control circuitry 404), from the items of content received in response to the first and second requests, a plurality of items of content related to the media asset. The media guidance application may perform this process by, for example, accessing the database that stores associations between entities and retrieving all entities associated with the entities corresponding to respective items of content of the plurality of items of content. When those entities are identified, the media guidance application may search for the selected media asset as one of the associated entities. If the media guidance application discovers that the media asset is in the list of associated media assets, the media guidance application may include the corresponding item in the plurality of items.

When the media guidance application identifies the second plurality of entities, the media guidance application may use that plurality to continue process 600 of FIG. 6. At step 610, the media guidance application transmits (e.g., via control circuitry 404), to a plurality of content sources associated with the second plurality of entities, a plurality of requests for items of content that are (1) related to a person corresponding to a respective entity of the second plurality of entities and are (2) available from the plurality of content sources. For example, the media guidance application may identify a website associated with a director of a movie and transmit a request to the website for any content that is available from that website. The request may be a request for all the content available from the website along with metadata.

At step 612, the media guidance application identifies (e.g., via control circuitry 404), based on responses to the plurality of requests, a plurality of items of content related to persons associated with the second plurality of entities and available from the plurality of content sources during a time interval. For example, the media guidance application may identify a podcast, a live chat session, and/or a live video conference related to a person that is associated with the media asset.

At step 614, the media guidance application generates for display (e.g., via control circuitry 404 on display 412) one or more content identifiers corresponding to one or more identified items of content in the plurality of items of content. For example, content identifiers for the above identified podcast, live chat session, and/or live video conference may be generated for display by the media guidance application.

It is contemplated that the descriptions of FIG. 6 may be used with any other embodiment of this disclosure. In addition, the descriptions described in relation to the process of FIG. 6 may be done in alternative orders or in parallel to further the purposes of this disclosure. For example, control circuitry 404 may submit multiple queries to the database in parallel, or it may submit multiple queries to a plurality of similar databases in order to reduce lag and speed the execution of the process. Furthermore, it should be noted that the process of FIG. 6 may be implemented on a combination of appropriately configured software and hardware, and that any of the devices or equipment discussed in relation to FIGS. 4-5 could be used to implement one or more portions of the process.

In some embodiments, the media guidance application may, when identifying, in the data structure associated with the first entity (e.g., entity 1102 of FIG. 11), the field of the type that identifies a person, perform the following actions. The media guidance application may retrieve a plurality of keywords, where each keyword identifies a person and compare a title of each field that is associated with the data structure with the plurality of keywords. Based on the comparing, the media guidance application may identify the field of the type that identifies a person. These actions have been described in detail in relation to process 700 of FIG. 7.

In some embodiments, the media guidance application may, when transmitting the first request to the first content source and the second request to the second content source for the items of content that are related to a person corresponding to the second entity, perform the following actions. The media guidance application may identify a first type of the first content source and a second type of the second content source. Based on a respective type of the first content source and the second content source, the media guidance application may retrieve a first request format associated with the first content source and a second request format associated with the second content source. The media guidance application may generate the first request based on the first request format and the second request based on the second request format, where both the first request and the second request comprise an identifier associated with of a person corresponding to the second entity. These actions have been described in detail in relation to process 900 of FIG. 9.

In some embodiments, the media guidance application may, when identifying, based on the data within the identified field, the second entity that corresponds to the person that is associated with the first entity and is not associated with the media asset, perform the following actions. The media guidance application may receive, from the database that stores associations between entities, a first plurality of entities associated with the person that corresponds to the first entity. The media guidance application may identify a second plurality of entities that includes entities within the first plurality of entities that identify a person and that are not associated with the media asset. The media guidance application may select an entity from the second plurality of entities. These actions have been described in detail in relation to process 800 of FIG. 8.

In some embodiments, the media guidance application may, when identifying, from the items of content received in response to the first and second requests, a plurality of items of content related to the media asset, perform the following actions. The media guidance application may receive, from the database that stores associations between entities, a plurality of entities associated with an item of content of the items of content received in response to the first or second request. The media guidance application may determine that one of the received entities represents the media asset and add the item of content to the one or more items of content. For example, the media guidance application may generate a query to the database that stores associations between media assets and receive back all the media assets that are associated with the specific item of content. If one of the received items of content represents the selected media asset, that item of content can then be presented to the viewer.

In some embodiments, the media guidance application may determine a type of content associated with each item of content in the plurality of items of content and generate for display, with the one or more content identifiers, a type indicator corresponding to a type associated with a respective item of content. For example, the media guidance application may determine from the metadata related to the content the type of content (e.g., a podcast, a chat session, a video-conferencing session, or another suitable type) for each item of content. Additionally or alternatively, the media guidance application may make the determination based on the format of the content or an extension associated with the file name of the content.

In some embodiments, the media guidance application may receive a user selection of a content identifier from the one or more content identifiers and generate for display a plurality of options corresponding to the type of content associated with the content item that corresponds to the selected content identifier. For example, based on determining that the type of content is a podcast, the media guidance application may include in the plurality of options one or more of: an option to start streaming the podcast, an option to start streaming the podcast to another device, and an option to record the podcast. In another example, based on determining that the type of content is an interactive communication session with the person associated with the content item, the media guidance application may include in the plurality of options one or more of: an option to connect to the communication session, an option to connect to the communication session using another device, and an option to save a transcript of the communication session.

In some embodiments, the media guidance application may generate for display some items of content and not generate for display other items of content. The media guidance application may, when generating for display the one or more content identifiers corresponding to the one or more identified items of content in the plurality of items of content that are available during the time interval, perform the following actions. The media guidance application may retrieve a value corresponding to the number of identified items to be generated for display and determine that the number of identified items to be generated for display is greater than the retrieved value. The media guidance application may select a subset of the identified items to be generated for display based on a weighted average of: a degree of association between each identified item (e.g., relationship strength value 1118 of FIG. 11) of content and the media asset, and a user's preference for a particular type of content. For example, the media guidance application may determine a weight for each item of content based on a degree of association between each identified item of content and the media asset and also a weight associated with the user's preference for the type of the item of content. The media guidance application may determine a degree of association between each identified item of content and the media asset based on a weight associated with a link between the item of content and the media asset. The media guidance application may retrieve the user's preference from the user's profile. The user's profile may be located locally on the same device that the media guidance application resides on. Additionally or alternatively, the user's profile may be located at media content source 516 and/or media guidance data source 518. The media guidance application may weight these two values in order to determine which items of content to present to the user. It should be noted that the weights may be modified by the user, the manufacturer of the user equipment device or configured by a distributor of the user equipment device. For example, both categories may be weighted equally in some implementations. However, in other implementations, the user's preferences may be weighted higher.

In some embodiments, the media guidance application may generate for display with the one or more content identifiers an indication of the entity corresponding to the respective content identifier. For example, the media guidance application may generate for display an icon corresponding to each type of item of content.

Figure 10:
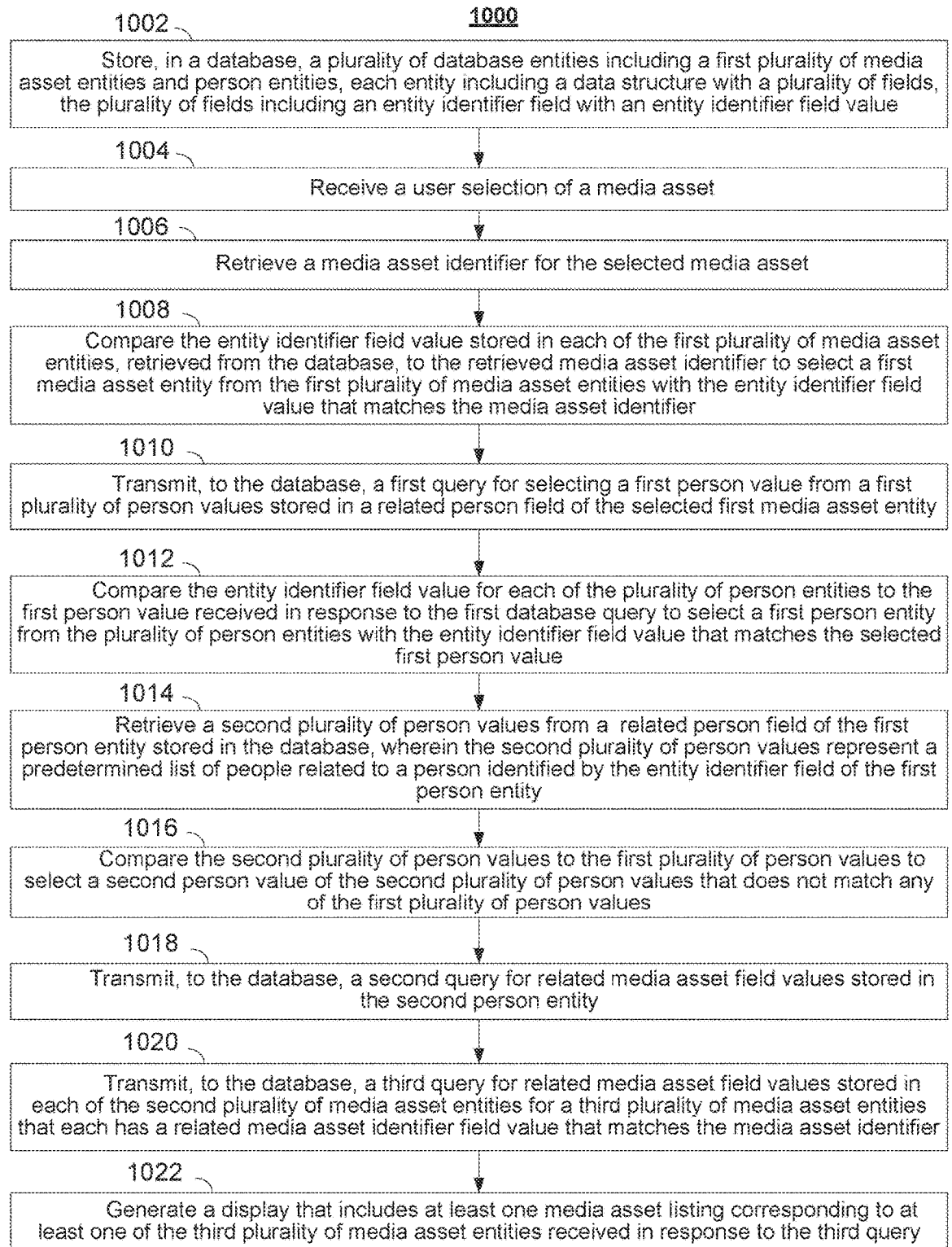
FIG. 10 depicts an illustrative process involved in identifying media asset entities indirectly related to a user-selected media asset, in accordance with some embodiments of this disclosure.

In some embodiments, the media guidance application may identify media asset entities for media assets indirectly related to a selected media asset. Process 1000 of FIG. 10 illustrates one possible process for this. At step 1002, the media guidance application (e.g. via control circuitry 404) stores, in a database, a plurality of database entities including a first plurality of media asset entities and person entities, each entity including a data structure with a plurality of fields, the plurality of fields including an entity identifier field with an entity identifier field value. For example, the media guidance application may transmit one or more insert queries to a database server to store, as entities (e.g., entities 1102, 1104, 1106, and 1108 of FIG. 11), objects corresponding to people and media assets. As referred to herein, the term insert query refers to a query executed against a database to insert data into a database. For example, an insert query may be used to insert objects (e.g., entities) into a database. The database may be located on the same device as the media guidance application or on a remote server (e.g., at media content source 516 and/or media guidance data source 518).

At step 1004, the media guidance application receives (e.g., via control circuitry 404) a user selection of a media asset. For example, the media guidance application may receive from a user input interface 410 a selection of a displayed media asset identifier corresponding to a media asset. At step 1006, the media guidance application may retrieve (e.g., via control circuitry 404) a media asset identifier for the selected media asset. For example, the media guidance application may access metadata associated with the media asset and retrieve the media asset identifier from the metadata.

At step 1008, the media guidance application may compare (e.g., via control circuitry 404) the entity identifier field value stored in each of the first plurality of media asset entities (e.g., identifier field of entity 1102), retrieved from the database, to the retrieved media asset identifier to select a first media asset entity from the first plurality of media asset entities with the entity identifier field value that matches the media asset identifier. For example, the media guidance application may retrieve multiple media asset entities from the database and compare the retrieved identifier with an identifier field value within a data structure corresponding to the entity.

At step 1010, the media guidance application transmits (e.g., via control circuitry 404), to the database, a first query for selecting a first person value from a first plurality of person values stored in a related person field of the selected first media asset entity. For example, the media guidance application may generate a query that includes as parameters the identifier of an entity to search (e.g., related entity 1114 of FIG. 11), the types of fields to search (e.g., a person field), and how many records to bring back (e.g., one record).

At step 1012, the media guidance application compares (e.g., via control circuitry 404) the entity identifier field value for each of the plurality of person entities to the first person value received in response to the first database query to select a first person entity from the plurality of person entities with the entity identifier field value that matches the selected first person value. For example, the media guidance application may generate a query based on a specific identifier corresponding to the person value from step 1010 to retrieve an entity (e.g., entity 1104 of FIG. 11) corresponding to the first person value.

At step 1014, the media guidance application retrieves (e.g., via control circuitry 404) a second plurality of person values from a related person field of the first person entity stored in the database, where the second plurality of person values represents a predetermined list of people related to a person identified by the entity identifier field of the first person entity. For example, the media guidance application may access a data structure for an entity corresponding to the first person and retrieve extract from the field representing people related to the first person identifiers corresponding to those people. The media guidance application may store the identifiers in memory for later use.

At step 1016, the media guidance application compares (e.g., via control circuitry 404), the second plurality of person values to the first plurality of person values to select a second person value of the second plurality of person values that does not match any of the first plurality of person values. For example, in order to drop from selection process the people related to the first person that are also related to the selected media asset, the media guidance application may generate a query to retrieve all person entities that relate to both the selected media asset and the person related to the media asset. That way no directly related people will be involved in the other steps.

At step 1018, the media guidance application transmits (e.g., via control circuitry 404), to the database, a second query for related media asset field values stored in the second person entity. For example, the media guidance application may generate a query based on the identifier that identifies the entity corresponding to the second person (e.g., entity 1106 of FIG. 11) and the type of field to search. As a result, the media guidance application may receive back from the database media assets related to the second person.

At step 1020, the media guidance application transmits (e.g., via control circuitry 404), to the database, a third query for related media asset field values stored in each of the second plurality of media asset entities for a third plurality of media asset entities that each has a related media asset identifier field value that matches the media asset identifier. For example, the media guidance application may transmit a query that accesses fields in each media asset entity related to the second person to determine which of those media assets that are also related to the originally selected media asset (e.g., entity 1108 of FIG. 11).

At step 1022, the media guidance application generates (e.g., via control circuitry 404) a display that includes at least one media asset listing corresponding to at least one of the third plurality of media asset entities received in response to the third query.

It is contemplated that the descriptions of FIG. 10 may be used with any other embodiment of this disclosure. In addition, the descriptions described in relation to the process of FIG. 10 may be done in alternative orders or in parallel to further the purposes of this disclosure. For example, control circuitry 404 may submit multiple queries to the database in parallel, or it may submit multiple queries to a plurality of similar databases in order to reduce lag and speed the execution of the process. Furthermore, it should be noted that the process of FIG. 10 may be implemented on a combination of appropriately configured software and hardware, and that any of the devices or equipment discussed in relation to FIGS. 4-5 could be used to implement one or more portions of the process.

FIG. 11 depicts illustrative diagrams of database structures, in accordance with some embodiments of this disclosure. Illustrative entities 1102, 1104, 1106, and 1108 may correspond to entities that may be stored in the database described above. Each entity may include a number of fields. For example filed 1110 is a type field associated with entity 1102. The value of the type field is media asset. Thus, entity 1102 may correspond to a media asset titled "The Bourne Identity." It should be noted that each entity may also correspond to a data structure that includes as data structure variables the fields associated with the respective entity. Another type of entity is a person as illustrated by label 1112. Each entity may include a related entities field that includes entities related to a respective entity. Thus, related entity 1114 is related to entity 1000. Only one related entity is shown for each respective entity. However, it should be noted that each entity may have multiple related entities.

Each entity may include a respective entity identifier 1116. Thus, related entities are linked using this identifier. It should be noted that in FIG. 1100, entity 1102 corresponding to the movie "The Bourne Identity" is linked to entity 1104 corresponding to Matt Damon, because Matt Damon featured in "The Bourne Identity". Furthermore, entity 1104 is linked to entity 1106 corresponding to Tom Hanks because Matt Damon and Tom Hanks featured together in "Saving Private Ryan." Likewise, entity 1106 corresponding to Tom Hanks is linked to entity 1108 corresponding to a media asset where Tom Hanks discusses "The Bourne Identity" because this media asset is feature Tom Hanks. Finally "Tom Hanks on the Bourne Identity" is linked with the movie "The Bourne Identity" because the subject matter of the media asset 1108 includes the movie "The Bourne Identity."

Each related entity may include a relationship strength field 1118 that stores a relationship strength value corresponding to how closely the entity being accessed is related to the related entity. Relationship strength values may be expressed with numbers, percentages, or any other suitable values.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:
1. A method comprising:
  transmitting, for display by a device, a first content item identifier of a first content item;
  retrieving, from a database, a first database entry that comprises (a) a name of a first actor that is shown in the first content item and (b) a link to a second database entry, wherein the second database entry comprises a name of a second actor that is not shown in the first content item;
  retrieving, from the database, a third database entry, wherein the third database entry comprises (a) the name of the second actor, (b) a second content item identifier for a second content item in which the first actor is not shown, and (c) a link to the first database entry; and
  transmitting, for display by the device, a second content item identifier of the second content item.

2. The method of claim 1, wherein retrieving the first database entry that comprises the name of the first actor that is shown in the first content item comprises selecting the second database entry from a plurality of related database entries identified by the first database entry, wherein the plurality of related database entries comprise at least one name of an actor that is not shown in the first content item.

3. The method of claim 1, further comprising transmitting a request to a content source for the second content item in which the second actor is shown.

4. The method of claim 3, wherein transmitting the request to the content source for the second content item in which the second actor is shown comprises:
  determining a format for a content type of the content source; and
  generating the request based on the format and the name of the second actor.

5. The method of claim 4, wherein the request is a first request, the content source is a first content source, the format is a first format, and the content type is a first content type, further comprising:
  determining a second format for a second content type of a second content source;
  generating a second request for a third content item based on the second format and the name of the second actor; and transmitting, for display by the device, a third content item identifier of the third content item.

6. The method of claim 3, wherein the request is a first request, further comprising:
transmitting a second request to the content source for a third content item in which the second actor is shown; and
determining to cause to be displayed the second content item based on a weighted average of (a) a first degree of association between the second content item and the first content item, (b) a second degree of association between the third content item and the first content item, and (c) a user's preference for a particular type of content.

7. A method comprising:
generating, for display, a first content item identifier of a first content item;
receiving a second content item identifier, wherein the second content item identifier is retrieved from a database by:
retrieving, from a database, a first database entry that comprises (a) a name of a first actor that is shown in the first content item and (b) a link to a second database entry, wherein the second database entry comprises a name of a second actor that is not shown in the first content item;
retrieving, from the database, a third database entry, wherein the third database entry comprises (a) the name of the second actor, (b) a second content item identifier for a second content item in which the first actor is not shown, and (c) a link to the first database entry; and
generating, for display, a second content item identifier of the second content item.

8. The method of claim 7, wherein retrieving the first database entry that comprises the name of the first actor that is shown in the first content item comprises selecting the second database entry from a plurality of related database entries identified by the first database entry, wherein the plurality of related database entries comprise at least one name of an actor that is not shown in the first content item.

9. The method of claim 7, further comprising transmitting a request to a content source for the second content item in which the second actor is shown.

10. The method of claim 9, wherein transmitting the request to the content source for the second content item in which the second actor is shown comprises:
determining a format for a content type of the content source; and
generating the request based on the format and the name of the second actor.

11. The method of claim 10, wherein the request is a first request, the content source is a first content source, the format is a first format, and the content type is a first content type, further comprising:
determining a second format for a second content type of a second content source;
generating a second request for a third content item based on the second format and the name of the second actor; and
generating, for display, a third content item identifier of the third content item.

12. The method of claim 7, wherein the request is a first request, further comprising:
transmitting a second request to the content source for a third content item in which the second actor is shown; and
determining to cause to be displayed the second content item based on a weighted average of (a) a first degree of association between the second content item and the first content item, (b) a second degree of association between the third content item and the first content item, and (c) a user's preference for a particular type of content.

13. A system for providing content related to a content item, the system comprising:
output circuitry configured to transmit, for display by a device, a first content item identifier of a first content item;
control circuitry configured to:
retrieve, from a database, a first database entry that comprises (a) a name of a first actor that is shown in the first content item and (b) a link to a second database entry, wherein the second database entry comprises a name of a second actor that is not shown in the first content item; and
retrieve, from the database, a third database entry, wherein the third database entry comprises (a) the name of the second actor, (b) a second content item identifier for a second content item in which the first actor is not shown, and (c) a link to the first database entry; and
the output circuitry further configured to transmit, for display by the device, a second content item identifier of the second content item.

14. The system of claim 13, wherein the control circuitry is configured to retrieve the first database entry that comprises the name of the first actor that is shown in the first content item by selecting the second database entry from a plurality of related database entries identified by the first database entry, wherein the plurality of related database entries comprise at least one name of an actor that is not shown in the first content item.

15. The system of claim 13, the output circuitry further configured to transmit a request to a content source for the second content item in which the second actor is shown.

16. The system of claim 15, wherein the output circuitry is configured to transmit the request to the content source for the second content item in which the second actor is shown by:
determining a format for a content type of the content source; and
generating the request based on the format and the name of the second actor.

17. The system of claim 13, wherein the request is a first request, the output circuitry further configured to:
transmit a second request to the content source for a third content item in which the second actor is shown; and
determine to cause to be displayed the second content item based on a weighted average of (a) a first degree of association between the second content item and the first content item, (b) a second degree of association between the third content item and the first content item, and (c) a user's preference for a particular type of content.

* * * * *